March 26, 1929.  B. D. COMYN  1,707,077
APPARATUS FOR SEPARATING LIQUIDS
Filed Aug. 17, 1928  2 Sheets-Sheet 1

Inventor

Bernard D. Comyn

By Pennie Davis Marvin Edmonds
Attorney

Patented Mar. 26, 1929.

1,707,077

UNITED STATES PATENT OFFICE.

BERNARD DALY COMYN, OF BRIDGE-OF-WEIR, SCOTLAND.

APPARATUS FOR SEPARATING LIQUIDS.

Application filed August 17, 1928, Serial No. 300,199, and in Great Britain August 10, 1927.

This invention relates to apparatus for separating the constituents of a mixture of liquids of unequal specific gravities, say a mixture of oil and water which may also contain air.

Apparatus according to the invention comprises a container having a substantially central inlet or inlets for liquid mixture and separate outlets for the several constituents, and means within the container whereby to confine the liquid to flow substantially horizontally free from eddies and oscillation along a plurality of passages away from the centre towards the periphery to be withdrawn through the separate outlets.

A practical construction may comprise a unit or a battery of units, said unit or each unit comprising a container, an inlet or inlets for liquid mixture disposed substantially axially of the container, a set of outlet connections for the heavier constituent extending from near the bottom of the container, a set of outlet connections for the lighter constituent located above the level of the inlet within the container, and a plurality of spiral guides extending from the inlet towards the lateral wall of the container, said guides being continued from the bottom of the container to an end wall above the terminus of the inlet, means being provided for regulating the relative speeds of delivery through said sets of outlet connections.

Figure 1:
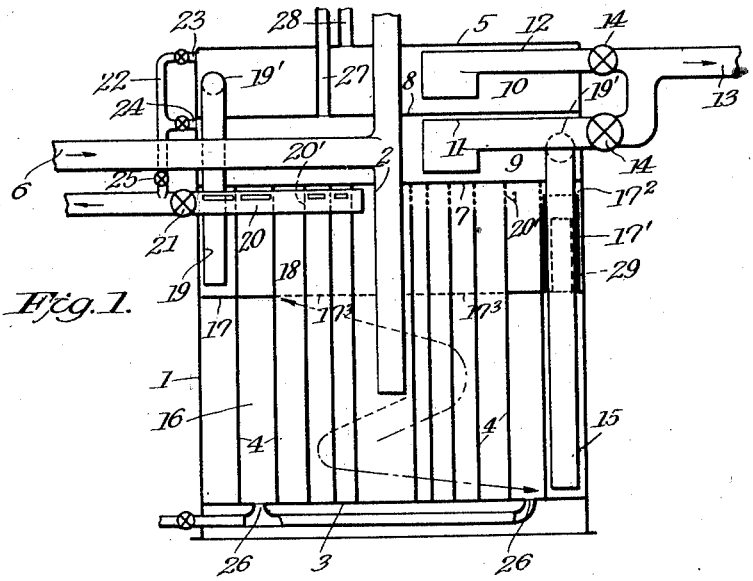
Figure 2:
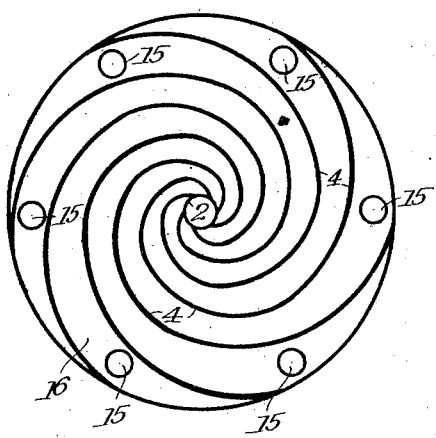
Figure 3:
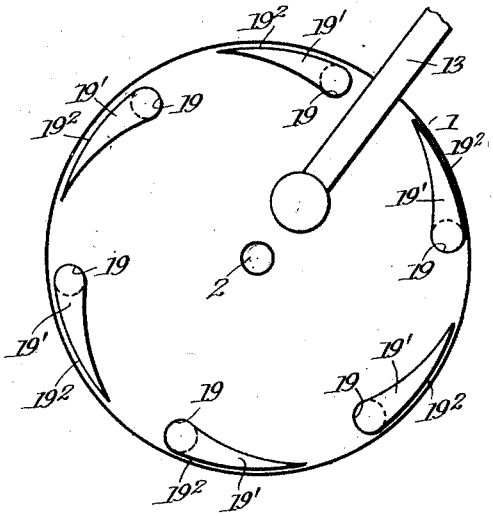
Figure 5:
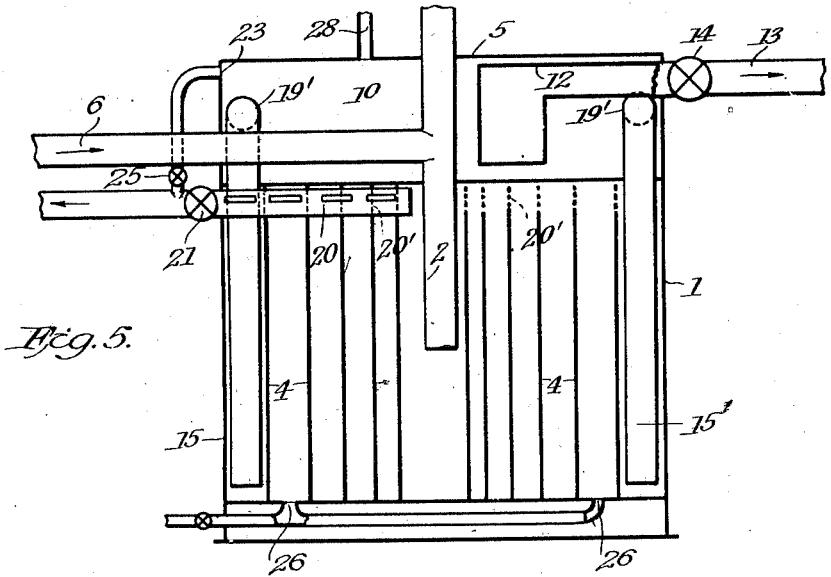
Figure 4:
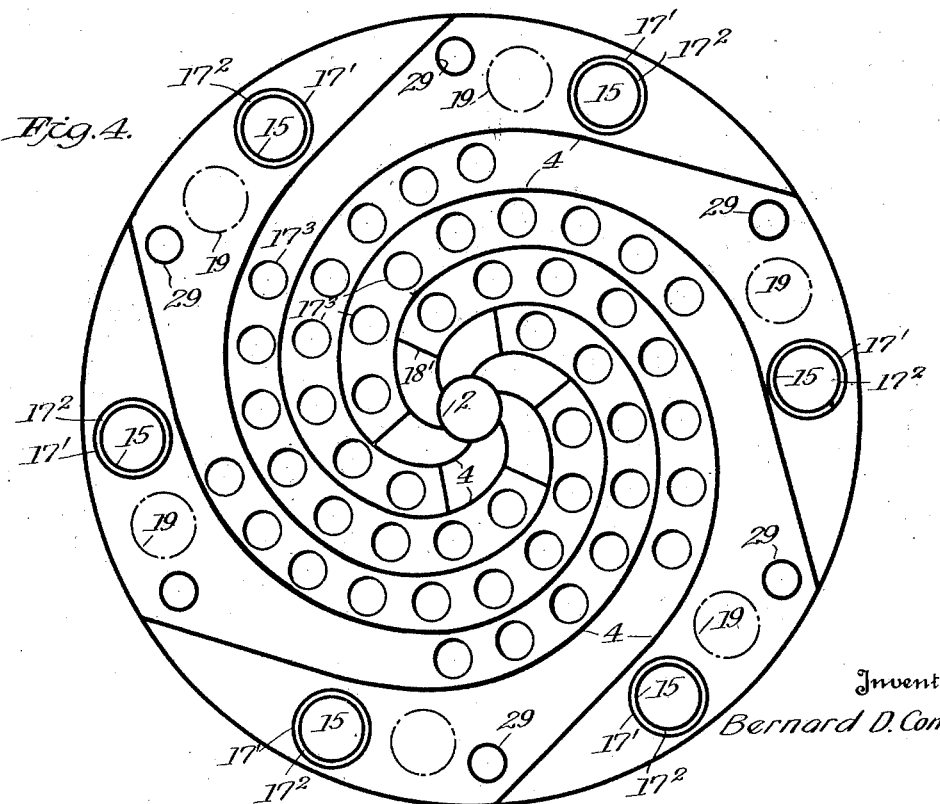

In the accompanying drawings Fig. 1 is a diagrammatic vertical section of a separating apparatus according to the invention; Fig. 2 is a horizontal section through the main segregation chamber showing the guides; and Fig. 3 is a horizontal section through the upper water compartment; Fig. 4 is a detail sectional plan view to a larger scale showing clearly the spiral guides; Fig. 5 is a vertical section showing an alternative construction.

Referring firstly to Figs. 1 to 4, the apparatus shown comprises a cylindrical container 1 disposed axially of which is an inlet pipe 2 terminating at a point spaced from the container bottom 3.

4 denotes interior spiral guides that start at points equidistant from the axis of the container and diverge spirally therefrom towards the periphery of the container; in the illustration the guides are each substantially formed as Archimedean spirals.

The inlet pipe 2 projects upwardly through the container cover 5, affording an air vent; by means of a lateral branch pipe 6 the inlet pipe 2 is supplied with liquid mixture.

Defined by spaced transverse partitions 7 and 8 and the cover 5 are a lower water compartment 9 and an upper water compartment 10, there being located in the lower compartment 9 a water discharge pipe 11 and in the upper compartment 10 a water discharge pipe 12. Both pipes 11, 12 merge into a common discharge pipe 13 located exteriorly of the container; each of the pipes 11, 12 is fitted with a control valve 14.

The lower portion 16 of the container constitutes the main segregation chamber; arranged around the periphery thereof are vertically disposed water pipes 15 extending from near the bottom of said chamber into the lower water compartment 9.

17 (Figs. 1 and 4) denotes a ported partition plate spaced from the under side of the partition 7 and bounding with said partition 7 an oil-receiving chamber 18 (Fig. 1) around the periphery of which are arranged pipes 19 extending upwardly through the lower water compartment 9 into the upper water compartment 10.

Disposed around the periphery of the plate 17 are upwardly projecting pipes 17' which terminate below the partition 7 and through which extend the pipes 15, there being formed between said pipes 17' and 15 annular oil passages $17^2$.

$17^3$ denotes ports formed in the plate 17 between the spiral guides 4.

The water pipes 15 and 19 are provided at their upper ends with cowls 19' presenting at $19^2$ (Fig. 3) outlet openings facing the inner peripheral surface of the container.

Projecting into the upper part of the oil chamber 18 is a radial open-ended slotted oil discharge pipe 20 fitted with an oil control valve 21 and having a branch 22 controlled by a valve 25 and adapted to be opened to the upper water compartment 10 by way of a valve-controlled port 23 and to the lower water compartment 9 by way of a valve-controlled port 24.

26 denotes valve-controlled dirt drain ports in the bottom of the container.

27 and 28 indicate air vents for the lower and upper water compartments 9, 10 respectively.

Stand pipes 29 (Figs. 1 and 4) are fitted to the ported partition 17 and project upwardly into the oil chamber 18.

It will be understood that the container is tapped near the bottom by the water pipes 15 and near the top by the oil discharge pipe 20 in the oil chamber 18.

The mixture of oil and water may be forced into the separator under pressure by a pump or the like or may be subject to gravity only.

As shown in Fig. 4, there may be fitted in the spiral passages in the segregation chamber 16 and in the oil-receiving chamber 18 of the container vertically disposed retarders 18′, which are preferably constituted by short plates interposed in the passages and stepped downwardly away from the axis of the container, the inner retarder plates in the segregation chamber 16 being disposed substantially level with the lower open end of the inlet pipe 2.

The upper edges of the spiral guides 4 are formed with diametrally opposed notches 20′ which at one side of the container accommodate the oil discharge pipe 20 and at the other side present a passage for flow of oil toward said pipe.

In operation, the mixture enters the apparatus in a state of turbulence, and flowing at a high velocity. The guides 4 direct the liquid towards the periphery of the container, said guides being so disposed that the liquid is caused to flow horizontally in several streams along substantially spiral paths of the same length away from the centre of the container, turbulence being gradually reduced concurrently with a gradual and uniform reduction of velocity so that the oil is free to rise vertically into the oil chamber 18 whence it escapes by way of the discharge pipe 20. A large percentage of the water passes to the water pipes 15 and thence to the lower water compartment 9 and so to the water discharge pipe 13 by way of the pipe 11. A small percentage of the water passes by way of the water pipes 19 into the upper water compartment 10 whence it passes to the water discharge pipe 13 by way of the pipe 12.

The water control valves 14 may be adjusted so that the desired quantity of water passes through each of them the oil discharge valve 21 being adjusted accordingly to deliver approximately the quota of oil in the mixture passing through the apparatus.

Scum collecting on the top of the water in the compartments 9 and 10 may be drawn off by way of the valve-controlled ports 23 and 24.

What I claim is:

1. Apparatus for separating the constituents of a mixture of liquids comprising a container having a substantially central inlet for liquid mixture and separate outlets for the several constitutents and means within the container whereby to confine the liquid to flow substantially horizontally free from eddies and oscillation along a plurality of passages away from the centre towards the periphery to be withdrawn through the separate outlets.

2. Apparatus for separating the constituents of a mixture of liquids, comprising a container having a substantially central inlet for liquid mixture, outlet connections for the heavier constituent extending from near the bottom of the container, and outlet connections for the lighter constituent located above the level of the inlet, and an end wall above the terminus of the inlet a plurality of spiral guides extending towards the lateral wall of the container, said guides being continued from the bottom of the container to said end wall, and means for regulating the relative speeds of delivery through said outlet connections.

In testimony whereof I have signed my name to this specification.

BERNARD DALY COMYN.